J. W. SEIBERT.
TROLLEY WHEEL.
APPLICATION FILED FEB. 5, 1908.

899,474.

Patented Sept. 22, 1908.

Witnesses
E. F. Stewart
J. N. Donegan

Inventor
Joseph W. Seibert.
By C. A. Snow & Co.
Attorneys

UNITED STATES PATENT OFFICE.

JOSEPH W. SEIBERT, OF WASHINGTON, PENNSYLVANIA, ASSIGNOR OF ONE-HALF TO ELIAS LEWIS, OF WASHINGTON, PENNSYLVANIA.

TROLLEY-WHEEL.

No. 899,474.            Specification of Letters Patent.          Patented Sept. 22, 1908.

Application filed February 5, 1908. Serial No. 414,428.

*To all whom it may concern:*

Be it known that I, JOSEPH W. SEIBERT, a citizen of the United States, residing at Washington, in the county of Washington and State of Pennsylvania, have invented a new and useful Trolley-Wheel, of which the following is a specification.

This invention relates to trolley wheels adapted to contact with overhead electric feed wires employed to propel cars of the passenger and freight type. The construction of devices of this kind is well known, and consists of a metal pole usually bifurcated at one end or provided with a harp to accommodate a trolley wheel or other sheave, the groove of which fits the over-head electric wire. It frequently happens that during the course of travel, and especially where rounding curves, that the trolley wheel or sheave becomes disengaged from the overhead wire and the connection between the the car and the source of power being broken renders the former helpless. This is a source of great annoyance both to the operator of the car and the passengers, for the reason that when the connection is broken at night the interior of the car remains in total darkness until such connection is again made.

The present invention has for its object to remedy this defect by providing each trolley wheel or sheave with a guard which is fitted to either side of the said trolley wheel in such a manner as to hold it connected to the over-head wire at all times.

It further provides a means for causing either of the guards to yield to the lateral strain of the trolley wheel in rounding curves, entering switches and the like.

Another object of the invention is to construct the guards so that they may, when desired, be revolved in unison with the wheel, or the wheel may revolve and the guards remain stationary.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
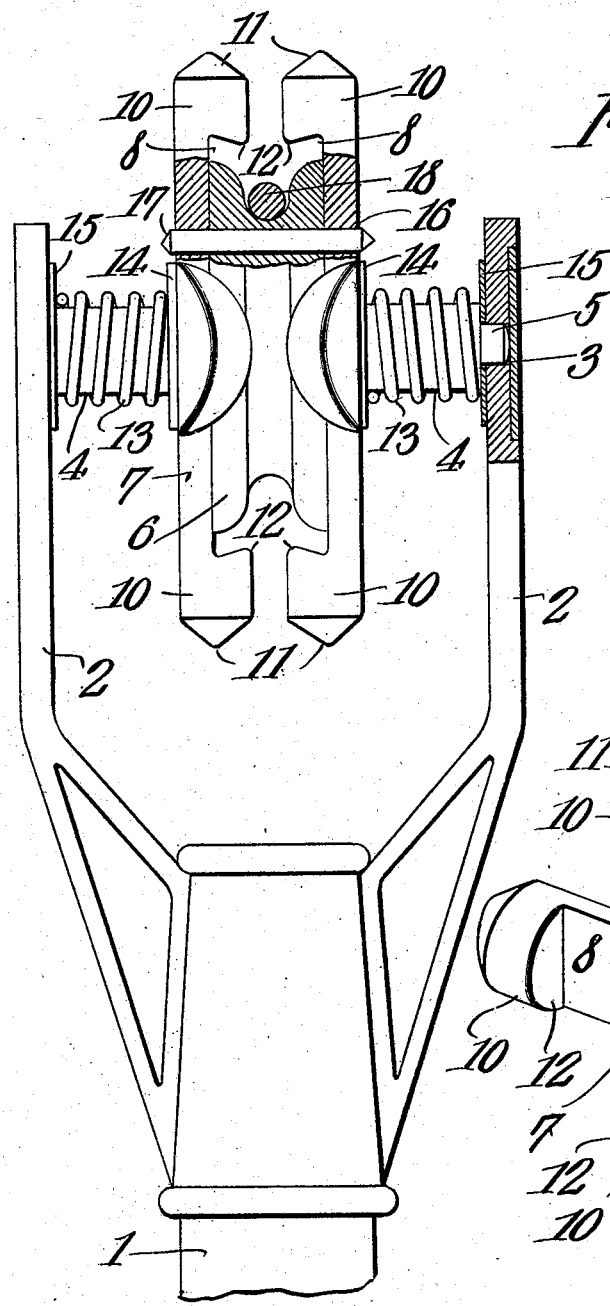
Figure 2:
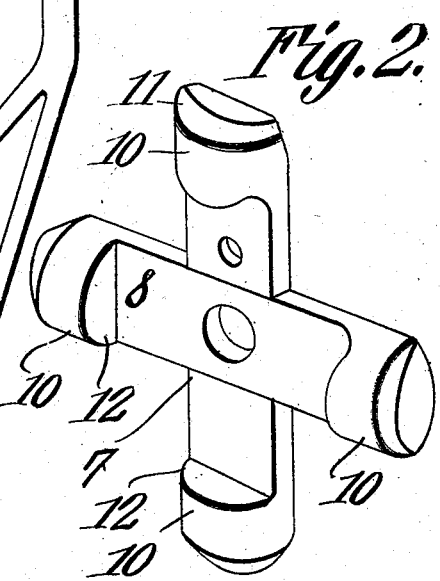

In the accompanying drawings:—Figure 1 is a plan view, partly in section, disclosing the adjustable devices for causing the guards to revolve with the wheels or remain stationary. Fig. 2 is an interior view of one of the guards.

Similar numerals of reference are employed to indicate corresponding parts throughout the several figures of the drawings.

1 designates the usual pole carried by a car, 2 the harp or bracket fitted to one end of the pole. The sides of the harp 2 adjacent the ends are provided with transverse openings 3. The shaft or axle 4 is provided at each end with the journals 5 which fit in the openings 3 of the harp 2. Freely mounted on the shaft 4 is the grooved wheel or sheave 6 of the usual type. The pair of guard members in the present instance are shown as comprising metallic plates 7 having radial arms the inner faces of which are recessed, as at 8, for a portion of their length, and are centrally provided with openings adapted to slidingly fit on the shaft or axle 4, the ends of the radial arms projecting beyond the periphery of the wheel and terminating in heads 10 beveled on their outer and inner extremities, as at 11, and forming flanges 12. When the guards are mounted on either side of the wheels 6, the space between the heads 10 will be of considerably less diameter than the wire, thereby checking any upward tendency of the same.

Mounted on the shaft 4 between the exterior faces of the guards 7 and the interior faces of the bracket 2, are the helically wound expansion springs 13, the ends of which bear on washers 14 on the outer faces of the guards, and the washers 15 on the inner faces of the harp 2. The function of the springs is to keep the wheel and guards centrally located on the shaft and to perform the further service of permitting the parts to yield with the lateral strain when the car is rounding curves. 16 is a transverse bore extending through the block 6 and guard 7 and concentric therewith. Fitting into this bore is a pin 17 the ends of which project beyond the outer surface of the guards 7. The pin performs the function of locking the parts so that the guards will revolve in unison with the wheel, as shown in Fig. 1, or permitting the wheel to revolve independently by removing the said pin.

The advantage to be gained by this construction is that in roads where very sharp turns exist, the pin can be removed, thus when a lateral strain is produced by a car rounding a curve and the wire leaves the groove of the wheel, it abuts one flange of the guard 7, moving it forward and the corresponding flange on the opposite side of the wheel is moved to the rear, the flanges thus occupying the position at an obtuse angle to each other, and the wire firmly held between. On roads where sharp curves do not exist, such as in former steam roads converted into electric, the device is to be used with a pin, as shown in Fig. 1.

The operation of the device may be better understood from the following description, the parts being in the position shown in Fig. 1, with the exception that the pin 17 has not been threaded to the wheel and guard. The pole 1 is depressed against the action of the springs at one end and secured to the top of a car, (not shown). The upper ends of the guard 7 are now brought beneath the overhead wire, the space between the heads directly underlying the wire 18. The pole is then allowed to move upward, and the upward force of the pole due to the springs at its lower end, is sufficient to overcome the resistance of the springs 13, thereby permitting the head 10 to part sufficiently to allow the wire 18 to enter at a recess in the groove of the wheel 6, as shown in Fig. 1. When the car moves forward, the wheel 6, due to the friction of wire 18, will revolve, and with it the guard 7, each pair of heads parting for the reception of the wire 18. Should the wire chance to leave the groove, these upward and lateral movements will be prevented by the flanges 12 and recessed portions 8.

I claim:—

1. An attachment for trolley poles embodying a harp and a shaft carried thereby, an independently rotatable and longitudinally movable grooved wheel on said shaft, guide members having opposed flat faces mounted on said shaft adapted for rotative and longitudinal movement independently of said shaft and wheel, said guide members having radial arms provided adjacent their outer ends and on their opposed inner faces with projecting flanges normally overhanging said grooved wheel.

2. An attachment for trolley poles embodying a harp and a shaft carried thereby, a wheel on said shaft having an eccentric opening, guide members on said shaft provided with openings adapted to register with the eccentric opening of said wheel, and a member adapted to enter said openings to lock the parts for rotary movement on said shaft.

3. An attachment for trolley poles embodying a harp and a shaft carried thereby, a grooved wheel on said shaft having an eccentric opening, guide members on said shaft provided with openings adapted to register with the eccentric opening of the wheel and having radial arms with flanges formed on the ends thereof adapted to overlie said wheel, and a member adapted to enter the openings of the wheel, and guide members to lock the parts for rotary movement on said shaft.

4. An attachment for trolley poles embodying a harp, and a shaft carried thereby, a wheel on said shaft having an eccentric opening, guide members on said shaft provided with openings adapted to register with the eccentric openings of the wheels, a locking pin adapted to enter said openings, and yielding positioning members encircling said shaft between the outer faces of said guide members and harp.

In testimony that I claim the foregoing as my own, I have hereto affixed my signature in the presence of two witnesses.

JOSEPH W. SEIBERT.

Witnesses:
  EDWARD J. BUTLER,
  THOS. C. SEIBERT.